(12) United States Patent
Geyer et al.

(10) Patent No.: US 6,618,357 B1
(45) Date of Patent: Sep. 9, 2003

(54) QUEUE MANAGEMENT FOR NETWORKS EMPLOYING PAUSE TIME BASED FLOW CONTROL

(75) Inventors: Joel Erwin Geyer, Cary, NC (US); Jeffrey James Lynch, Apex, NC (US); Joseph Gerald McDonald, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/432,048

(22) Filed: Nov. 1, 1999

Related U.S. Application Data

(60) Provisional application No. 60/107,202, filed on Nov. 5, 1998.

(51) Int. Cl.[7] .................................................. H04J 3/14
(52) U.S. Cl. ........................ 370/236; 370/410; 370/428
(58) Field of Search ................................. 370/229, 230, 370/231, 235, 236, 412, 420, 400, 389, 410

(56) References Cited

U.S. PATENT DOCUMENTS

| | | | | |
|---|---|---|---|---|
| 5,905,870 A | * | 5/1999 | Mangin et al. ........ | 395/200.64 |
| 6,108,306 A | * | 8/2000 | Kalkunte et al. ........... | 370/235 |
| 6,115,356 A | * | 9/2000 | Kalkunte et al. ........... | 370/229 |

* cited by examiner

*Primary Examiner*—Alpus H. Hsu
*Assistant Examiner*—Roberta Stevens
(74) *Attorney, Agent, or Firm*—Carlos Munoz-Bustamante; Winstead, Sechrest & Minick, P.C.

(57) ABSTRACT

In pause time based flow control systems having station-level granularity, a station or switch may detect congestion or incipient congestion and send a flow control frame to an upstream station, commanding that upstream station to temporarily stop (pause) sending data for a period of time specified in the flow control frame. The traffic pause gives the downstream station time to empty its buffers of at least some of the excess traffic it has been receiving. Since each downstream station operates independently in generating flow control frames, it is possible for the same upstream station to receive multiple, overlapping pause commands. If an upstream station which is already paused receives subsequent flow control frames from the same downstream station that triggered the pause, the upstream station's pause timer is rewritten using the pause times in the successive flow control frames. If the upstream station receives flow control frames from different downstream stations, the upstream station updates the pause timer only if the pause time in the most recent flow control message is greater than the remaining part of the previously established pause time.

20 Claims, 3 Drawing Sheets

QUEUE MANAGEMENT FOR NETWORKS EMPLOYING PAUSE TIME BASED FLOW CONTROL

This application claims the benefit of provisional application No. 60/107,202 filed Nov. 5, 1998.

FIELD OF THE INVENTION

The present invention relates to data communications networks and more particularly to a method and system for queue management in networks employing pause time based flow control.

BACKGROUND OF THE INVENTION

When data processing systems first began to be used commercially on a widespread basis, the standard system configuration was an autonomous mainframe or host computer which could be accessed only through locally-attached terminals. Few people, at that time, perceived any significant benefit from interconnecting host computers.

Over time, it came to be understood that significant commercial advantages could be gained by interconnecting or networking host computers. Data originating with users at one host computer could readily and rapidly be shared with users located at other host computers, even where those other host computers were many miles away. Also, the functional capabilities of a given host computer could be treated as a resource that could be shared not only among locally-attached users but also among remote, network-attached users. Mainframe networks of this type came to be generically referred to as Wide Area Networks, commonly abbreviated to WANs.

Certain parallels existed between the development of mainframe computer technology and the later development of personal computer technology. Early personal computers were relatively unsophisticated devices intended for use by a single user in a stand-alone configuration. Eventually, the same kinds of needs (data sharing and resource sharing) that drove the development of mainframe networks began to drive the development of networks of personal computers and auxiliary devices, such as printers and data storage devices.

While mainframe networks developed primarily using point-to-point connections among widely separated mainframes, personal computer networks developed using a shared or common transmission media to interconnect personal computers and auxiliary devices within a geographically-limited area, such as a building or even an area within the building. Networks of this type came to be generically referred to as Local Area Networks or LANs.

Different LAN technologies exist. Currently the most popular LAN technology is ethernet technology. In an ethernet LAN, personal computers and auxiliary devices share a common bi-directional data bus. In the following description, LAN-attached devices will be generically referred to as stations or LANs stations. Any transmission-capable LAN station may initiate transmission on the bus and every transmission propagates in both directions and is received by every LAN station attached to the same bus, including the transmitting station.

Another popular LAN technology is token ring technology. In a token ring LAN, LAN stations are connected in a logical ring. A station having data to send on the ring looks for a special frame known as a token. When the station receives the token, it writes the data onto the logical ring. The data propagates around the ring through each successive LAN station. If a LAN station receiving the data is the intended destination, that station copies the data into station memory but passes the data onto the next station on the ring. The data continues around the ring until it returns to the transmitting station, which strips the data from the ring but writes the token back onto the ring for use by another station having data to send.

The same user needs (data sharing and resource sharing) which drove the development of LANs have driven the creation of networks consisting of multiple LANs interconnected through boundary devices known as LAN bridges or switches. Point-to-point connections or links between LAN switches permit traffic originating in any given LAN to be transported to a LAN station connected to any other LAN in the same switched network. The given switch-to-switch link typically carries traffic from multiple sources concurrently. Although local area networks, such as ethernet and token ring networks, were originally developed as shared-media LAN technologies, "switched" technologies are being developed to support full point-to-point duplex links among individual LANs.

In a switched LAN network, multiple stations may decide they want to send data at substantially the same time. If the multiple stations are all on the same LAN, the LAN technology includes a mechanism for avoiding "collisions" among the multiple stations. As noted earlier, token ring LANs use a token to control transmission. The first station to acquire the token gains access to the ring to the exclusion of other stations who may also had data to send.

In ethernet LANs, a Collision Sense Multiple Access/Carrier Detect (CSMA/CD) protocol is used to resolve conflicts among contending users. When the station has data to transmit, it "listens" to the bus to see if the bus is already carrying data from another station. If the bus is found not to be in use, the listening station begins its own transmission immediately. If the bus is found to be in use, the station with data to send waits for a predetermined interval before restarting the bus acquisition process. Since electrical signals require time to propagate down any conductor, two or more stations can listen, find the bus quiet at the time, and begin transmitting simultaneously. If that happens, data from the transmitting stations collide and becomes corrupted. If the transmitting station doesn't detect the same data transmitted, that station sends a shortjamming signal and stops transmitting. The jamming signal increases the chances that all other transmitting stations will detect the collision and stop transmitting themselves. Following a random delay, each transmitting station restarts the bus acquisition process.

The noted protocols, while fairly effective within single LANs, are ineffective in controlling flow in switched LAN networks since the traffic on any particular link in a switched network usually represents an aggregation of traffic originating at multiple source stations, each of which has legitimately acquired the right to write data onto the shared media of its own local LAN. To provide flow control in switched LAN networks, standards groups such as the Institute of Electrical and Electronic Engineers (IEEE) and the International Telecommunications Union (ITU) have defined link-level flow control protocols. If a system or node in a switched network determines that a link is beginning to supply more traffic than the node can accommodate, the node can start a flow control operation which will reduce the amount of traffic being received at the node over the link in question before the link causes the node to become congested. Whether a node is considered congested is usually determined by whether buffer memories (buffers) at the node have become filled beyond a predetermined threshold, expressed usually as a percentage of maximum buffer capacity. The goal of any flow control mechanism is to avoid a situation in which a node's buffer has become fully loaded, leaving the node no choice but to discard arriving packets.

In the following discussion, the terms "upstream" and "downstream" will be used frequently. These terms are used to define the direction of the data flow relative to a particular node or station. Any station or link which supplies data to a given node is considered to be "upstream" of the given node. Any station or link to which the given node sends data is considered to be "downstream" of the given node.

Under at least one known standard, a node that wants to limit the amount of data received over an upstream link generates a pause frame which contains, among other things, a pause time. Pause times are usually expressed as a number of time slots, with a time slot being the time required to transmit a sixty-four byte packet on the link. When a pause frame is received at the intended upstream station, the station will temporarily suspend transmission of any further traffic over the link for the pause time specified in the pause frame. The pause time gives the affected node time to recover by emptying its buffers of at least some of the excess traffic it has been receiving.

A problem with link-level flow control is that every station supplying traffic to the link is affected whether or not that station is a source of the congestion-inducing traffic or is actually performing within expected parameters. To avoid penalizing well-behaving traffic sources, proposals have been made to extend the concept of link-level flow control down to a station level. According to these proposals, stations that are actually contributing to congestion or near-congestion would be identified by downstream nodes and would be sent pause frames to cause only the misbehaving stations to temporarily suspend or pause sending of traffic for the pause time specified in the pause frames. Traffic source stations that behave within expected parameters would not be affected by flow control messages directed to misbehaving source stations.

The various proposals for station-level flow control have focused on the conditions under which flow control messages are generated or how a downstream node can schedule multiple pause frames to be sent to upstream stations to distribute those pause times over a control period rather than have all pause times start and stop at nearly the same times. The proposals have not focused on the fact that an upstream station may receive multiple pause frames from different downstream nodes and that those pause frames may be inconsistent with each other; that is, may instruct the same upstream station to pause for different, overlapping periods of time.

SUMMARY OF THE INVENTION

The present invention is a queue or flow management technique which deals specifically with problems created when a source of data traffic in a network receives inconsistent pause frames from multiple downstream stations or nodes.

In one embodiment of the invention is a method to implement and a network element which operates either in a transmit state or a paused state. The operational state of the network element is controlled in accordance with flow control messages received from destination elements. Each of the flow control messages includes, among other things, a pause time. The network element which receives the flow control message determines whether the network element is already in the paused state when the message is received. If the network element is not in the paused state, it is set into that state and a counter is triggered. The counter times out after the pause time specified in the flow control message. If the network element is already in the paused state and if recently received flow control messages came from the same destination element, the counter is reset or rewritten using the pause time in the most recent flow control message. Otherwise, the counter is set to that pause time only if the pause time is greater than the time remaining in the current pause interval. The network element is returned to the transmit state when the counter finally times out.

BRIEF DESCRIPTION OF THE DRAWINGS

While the specification concludes with claims particularly pointing out and distinctly claiming that which is regarded as the present invention, details on a preferred embodiment of the invention may be more readily ascertained from the following detailed description when read in conjunction with the accompanying drawings wherein:

DESCRIPTION OF PREFERRED EMBODIMENT

Figure 1:
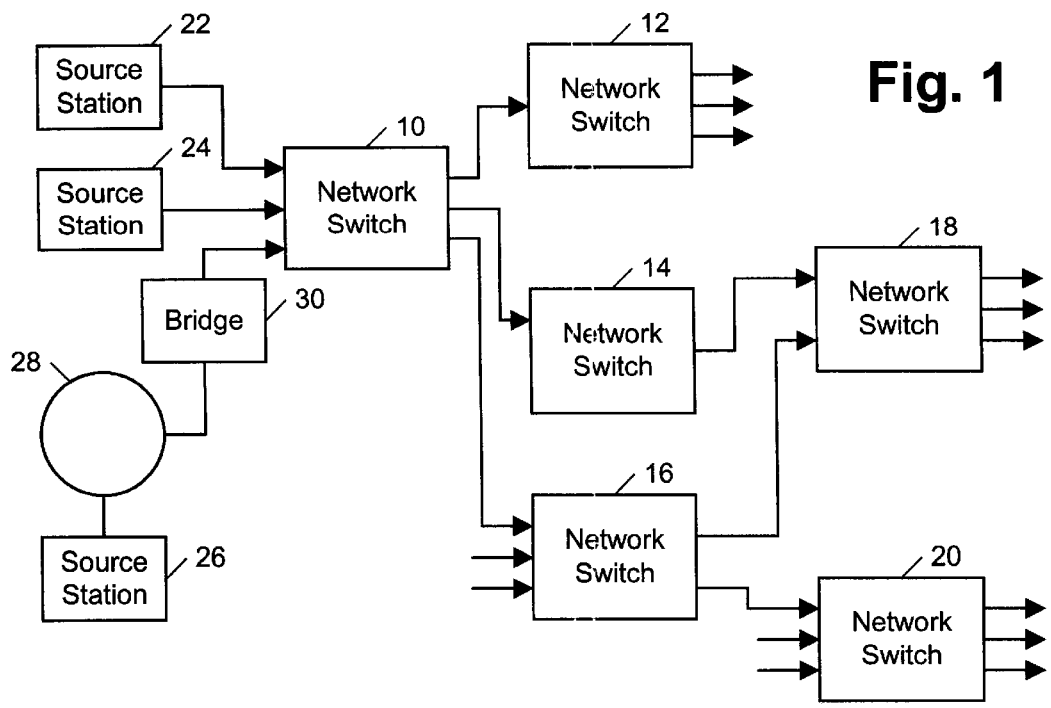
FIG. 1 is a block diagram showing network elements in which the invention would be implemented.

FIG. 1 is a block diagram of a network showing a plurality of network switches 10, 12, 14, 16, 18 and 20, each of which can have multiple input ports for receiving data traffic from other switches or from source stations, such as stations 22, 24 and 26, and multiple output ports for supplying data traffic to other switches or stations. Source stations may be directly connected to network switch 10, as illustrated for source stations 22 and 24. In typical networks, most source stations are in local LANs and cannot be directly connected to a network switch. A local LAN station, such as source station 26, is connected indirectly to network switch 10 through the LAN shared media 28 and a network bridge 30. The bridge 30 can be a conventional, network device for purposes of this invention and will not be described further.

It is assumed that each of the network switches has several conventional capabilities. First, it is assumed that each switch has buffers in which data received from upstream devices can be temporarily stored before being passed on to downstream devices. Second, it is assumed that each of the network switches is capable of recognizing when those buffers are becoming too heavily loaded. Third, it is assumed that each of the network switches is capable of identifying source stations which may be contributing to the buffer loading. Fourth and finally, it is assumed that each of the network switches has the capability of generating a pause frame which may be directed back upstream to the identified source stations.

Since each network switch operates independently from other network switches when monitoring the fill level of its own buffers, several network switches may conclude at nearly the same time that a particular source station is providing too much traffic and should be temporarily paused. Because the network switches are connected to different sets of traffic sources, it is to be expected that the buffers in different network switches may be filled at different rates and different times. Consequently, it is also to be expected that multiple, overlapping pause frames may be generated and directed to a particular source station over a given period of time.

Figure 2:
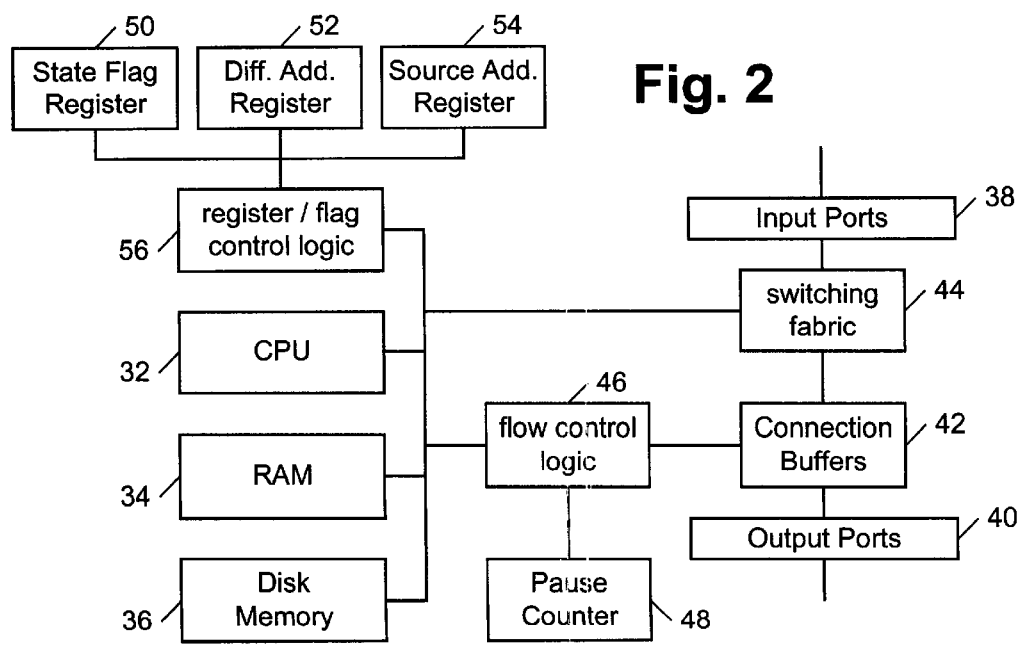
FIG. 2 is a more detailed block diagram of the hardware components essential to a station or node implementing the present invention.

The present invention is directed to a method which can be performed at a traffic source station to deal with multiple overlapping flow control messages received during typical system operation. While the invention is described primarily in the context of the original traffic source stations, the invention can be implemented in any node or system which includes certain functional elements described with reference to FIG. 2. The node, of course, includes conventional data processing elements such as CPU 32, random access memory (RAM) 34 and the bulk memory, typically disk memory 36 using fixed and/or removable machine readable media.

Depending on whether the implementing system is an end station or an intermediate network device such as a network switch, different port and switching configurations may exist. In a network switch, multiple input ports 38 and multiple output ports 40 would be standard as would be a set of connection buffers 42 and a switching fabric 44. In an end station, the number of input and output ports might be limited to one or a few ports and the switching fabric may be rudimentary or may not even exists. Either an end station or an intermediate device such as a network switch must include a set of buffers 42 in which data may be temporarily stored under the control of flow control logic 46. The operation of flow control logic 46 requires the use of a pause timer or pause counter 48.

Other elements which must be included in any implementing node or system are sets of registers for storing specific variables. State flag register 50 can be a one bit register for storing a state flag indicating whether the node is operating in a paused state in which traffic is stored in the buffers 42 rather than being passed on to the output ports 40 or a transmit state in which the traffic is being supplied to the output ports 40 rather than being buffered. A different address register 52 can also be a one bit register. The different address register stores a binary variable which indicates whether a set of recently received flow control messages all originate from the same destination element.

Finally, flow control source address register 54 is a multibit storage register which contains the address of the network element which generated the first flow control message in a set of recently received flow control messages. Registers 50,52 and 54 operate under the control of a register/flag to control logic 56.

While the registers, the control logic and the pause counter have been represented as discrete elements, each of these could actually be implemented through the use of addressable storage locations in RAM 34. They are represented as discrete elements to better illustrate their functional properties.

Figure 3:
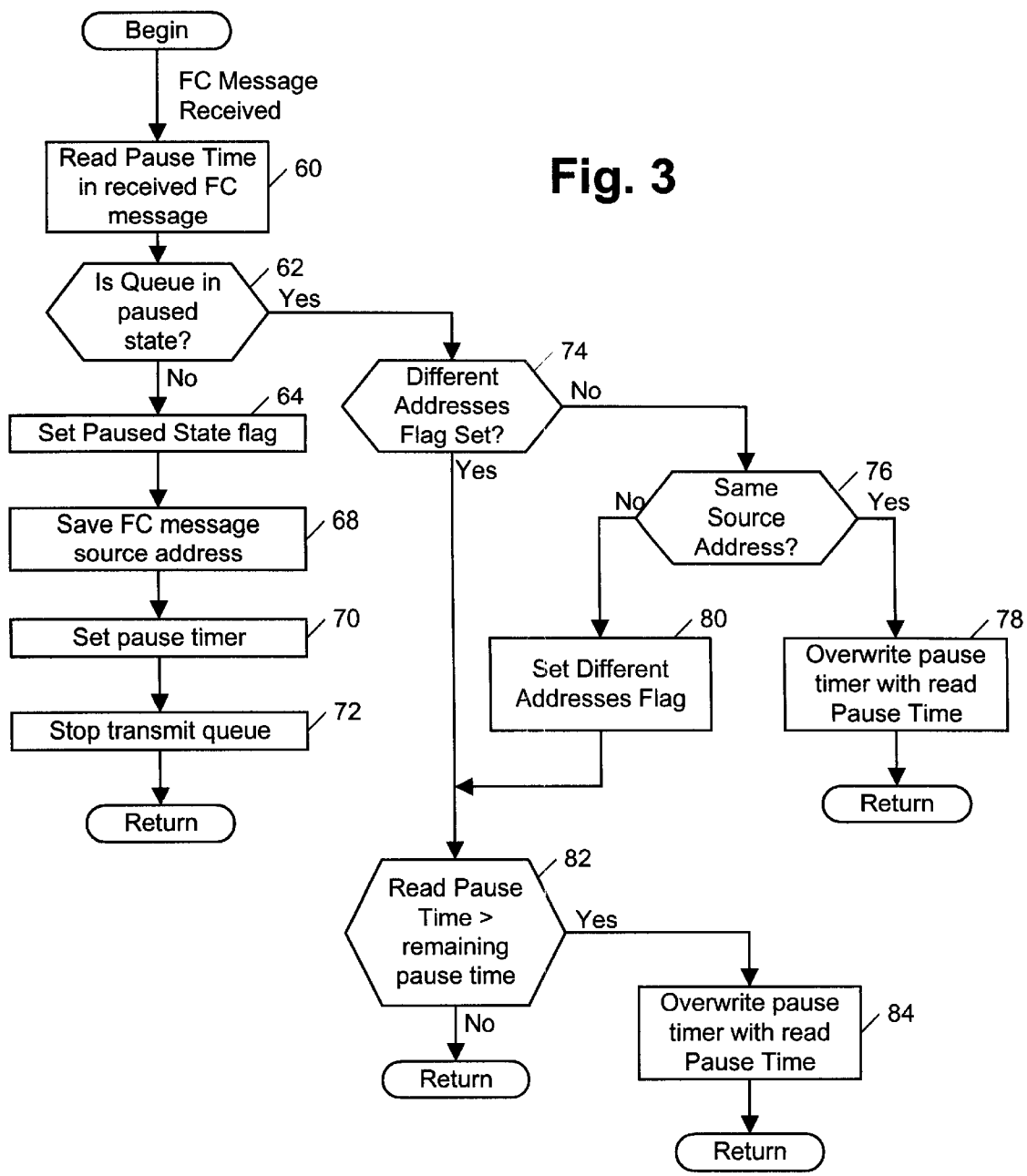
FIG. 3 is a flow chart of method steps implementing the present invention.

FIG. 3 is a flow chart of method steps that are performed in implementing the invention in a node or system. Before any flow control actions are performed, the set of initial conditions described in Table 1 below exist.

TABLE 1

Initial Conditions

| | |
|---|---|
| state flag | 0 (transmit state) |
| different addresses flag | 0 (no different addresses) |
| FC source address register | empty |
| pause count | zero |

The initial conditions persist until the first flow control (FC) message is received at the node. The Pause Time field in the first FC message is read in step 60 to determine how long operation is to be paused at the station. The applicable state flag register is checked in steps 62 to determine whether the station, or at least the relevant queue in the station, is already in a paused state. For the first flow control message, the station should have previously been in a transmit state and a negative result to step 62 is to be expected. Assuming the expected result is seen, the Paused State flag is set in step 64 and the address of the source of the flow control message is saved in step 68. The pause timer is written with the Pause Time value extracted from the received flow control message to establish the duration of the paused state. The end result of the above is that the station enters a paused state at least with respect to one of its queues meaning that transmission through that queue is stopped in a step 72.

Following processing of the first flow control message, the conditions set forth in Table 2 exist at the node.

TABLE 2

Conditions Following first FC message

| | |
|---|---|
| Paused state flag | 1 (paused state) |
| Different Addresses flag | 0 (no different addresses) |
| FC source address register | from first FC message |
| pause count | from first FC message |

Once the first flow control message has been processed, the queue will be set into a paused state. Assuming the next flow control message is received before the pause timer times out from the first message, test 62 will respond positively when the next flow control message is processed. Subsequently, a test 74 determines whether the Different Addresses flag is set already. For at least the second flow control message, this flag should still be in its initial state.

The address of the source of the second flow control message is then compared in step 76 to the address already stored in the FC source address register to determine whether the two addresses match; that is, whether the same downstream station was the source of both flow control messages. If step 76 shows that the same downstream station did supply both messages, the count in the pause timer is rewritten to the Pause Count value contained in the second message in a step 78 before the flow control process ends. Table 3 shows the conditions at the station following receipt of two or more flow control messages from the same downstream station.

TABLE 3

Conditions Following Receipt of Two (or more)
FC Messages From the Same Downstream Station

| | |
|---|---|
| state flag | 1 (paused state) |
| different addresses flag | 0 (no different addresses) |
| FC source address register | from first FC message |
| pause count | from first FC message |

If, however, step 76 shows that a different downstream station supplied the second flow control message, the Different Addresses flag is set in step 80. The Pause Time in the second flow control message is compared to the current account of the pause timer. The count in the pause timer at any given time indicates how much longer the station will operate in the paused state if the timer count is not modified. Where the flow control messages have been received from different downstream stations, the pause time is set to the time set in the most recently received message in a step 84 only if message's pause time is greater than the remaining pause time; that is, only if rewriting the pause time will cause the station to remain in the paused state for a longer period of time. If the message's pause time is less than or equal to the time remaining (as indicated by a No exit from step 82), the operation of the pause timer is not modified. The conditions following receipt of a flow control message from the second of two different downstream stations are shown in Table 4 below.

TABLE 4

Conditions Following Receipt of FC Messages
from at least two Different Downstream Stations

| | |
|---|---|
| state flag | 1 (paused state) |
| different addresses flag | 0 (different addresses) |
| FC source address register | from first FC message |
| pause count | from latest FC message only if >current count; otherwise no change |

The process steps described with reference to FIG. 3 will be repeated in accordance with the above description as long as the implementing station remains in a paused state; that is, until the pause timer times out. When the pause timer does time out, the flow control logic and the register/flag control respond to the time out by re-establishing the conditions specified in Table 1 above.

Figure 4:
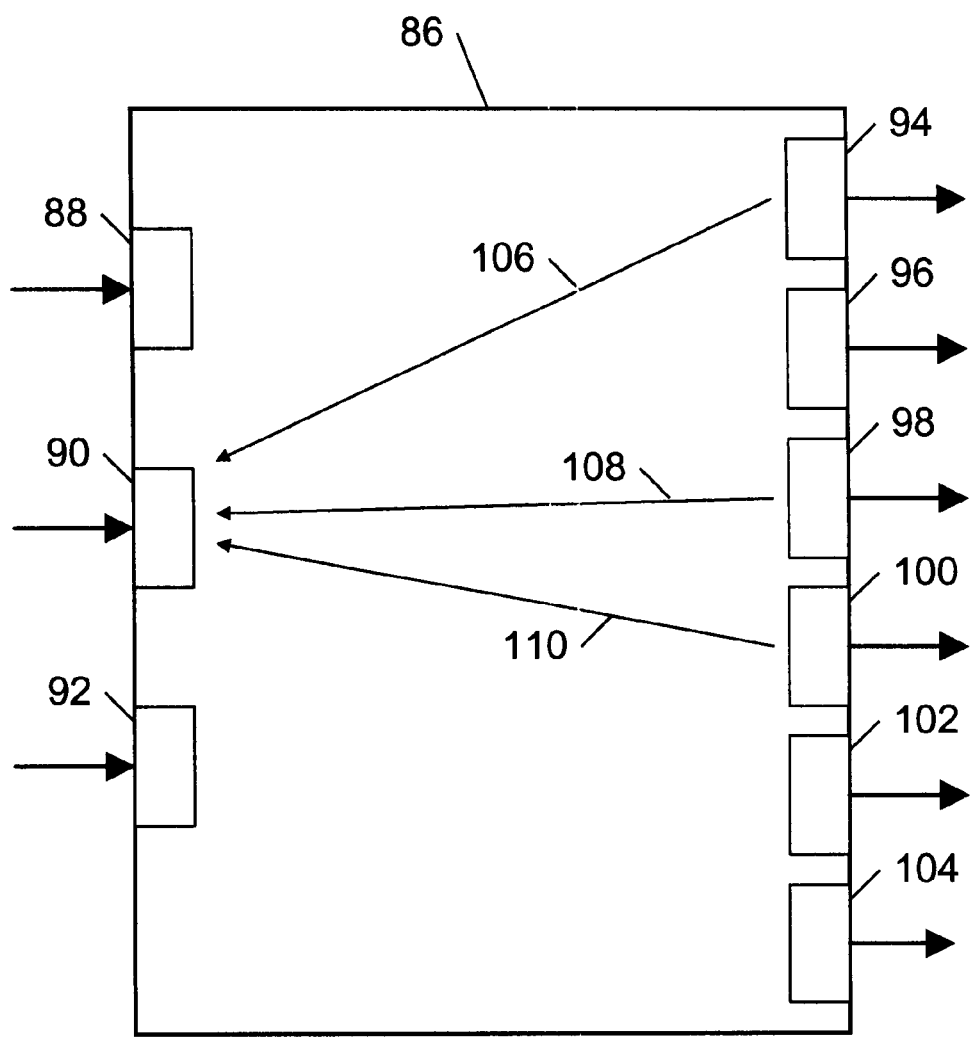
FIG. 4 is a block diagram of a single node, used to explain the application of the invention within a node.

The discussion above has dealt with the use of the invention in terms of node-to-node communications in a multinode switched network. The same principles can be applied to provide flow control within a single switch. FIG. 4 depicts a switch having multiple input ports 88, 90 and 92 and multiple output ports 94, 96. 98, 100, 102 and 104 which are interconnected by a suitable switching fabric (not shown) to provide any-to-any connections between any of the input ports and any of the output ports. Flow control can be implemented in such a switch by monitoring each of the output ports for actual or incipient congestion. Because each output port may receive traffic from any of the input ports, it is possible for several output ports to become so heavily loaded as to necessitate separate flow control actions.

Each of the flow control messages 106, 108, 110 would be sent from one of the output ports to the input port which is viewed as the "source" of the excess traffic. The process described with reference to FIG. 3 can be used to control the response of input port 90 to multiple flow control messages. In applying the method to the internal operation of a switch, the output port ID would be used in place of the FC message source address and the input port would be considered to be the implementing node or system. It is, of course, possible that the input port which establishes the proper input port pause time may also take corrective action external to the switch by forwarding flow control messages to one or more upstream stations.

There has been described what is considered to be a preferred embodiment of the present invention. Variations of and modifications to the preferred embodiment will occur to those skilled in the art once they become familiar with the preferred embodiment. Therefore, it is intended that the appended claims shall be construed to include both the preferred embodiment and all variations and modifications as fall within the spirit and scope of the invention.

What is claimed is:

1. For use at a network element which operates in either a transmit state or a paused state, a method of controlling the operational state of the network element in accordance with flow control messages received from destination elements, e each of said flow control messages including a pause time, said method comprising the steps of:

determining whether the network element is already in the paused state when a flow control message is received;

if the network element is not in the paused state, setting said network element into the paused state and triggering a counter to time out after the pause time in the received flow control message;

if the network element is already in the paused state and if a set of recently received flow control messages came from the same destination element, resetting the counter using said pause time, otherwise resetting the counter to said pause time only if resetting the counter will extend the period of time during which the network element remains in the paused state; and returning said network element to the transmit state when the counter times out.

2. A method as set forth in claim 1 further including the steps of maintaining a pause state flag at the network element by:

setting said flag to a first value each time the counter is triggered or reset; and setting said flag to a second value each time the counter times out.

3. A method as set forth in claim 2 wherein the set of recently received flow control messages is limited to flow control messages received since the last time the counter was triggered.

4. A method as set forth in claim 3 wherein the step of determining whether the network element is in the paused state comprises reading the current value of said flag.

5. For use at an input port of a packet switching device having multiple input ports and multiple output ports, each said input port having an input buffer, a method for controlling whether an input port operates in a paused state wherein arriving packets are directed to the input buffer or a transmit state wherein arriving packets are directed to one of the output ports, said method comprising the steps of:

responding to a flow control message received from one of the output ports by determining whether the input port is already in the paused state, each flow control message including a pause time;

if the input port is not in the paused state, setting it into said state and triggering an input port counter to time out after the pause time in the received flow control message;

if the input port is already in the paused state and if a predetermined set of recently received flow control messages all came from the same output port, resetting the input port counter to said pause time, otherwise resetting the input port pause counter only if resetting the counter will extend the period of time during which the input port remains in the paused state;

returning said input port to the transmit state when the counter counts through the pause time.

6. A method as set forth in claim 5 further including the steps of maintaining an input port pause state flag by:

setting said flag to a first value each time the input port counter is triggered or reset; and setting said flag to a second value each time the input port counter times out.

7. A method as set forth in claim 6 wherein the set of recently received flow control messages is limited to flow control messages received at the input port since the last time the input port counter was triggered.

8. A method as set forth in claim 7 wherein the step of determining whether the input port is in the paused state comprises reading the current value of the input port pause state flag.

9. For use in a network device which receives packets from upstream devices and directs those packets to downstream devices, a method for controlling whether said network device is set into a paused state wherein received packets are temporarily stored in said network device or into a transmit state wherein received packets are directed to one or more of the downstream devices, said method comprising the steps of:

responding to a flow control message received from one of the downstream devices by determining whether said network device is already in the paused state, said flow control message including a pause time;

if the network device is not in the paused state, setting it into said state and triggering a counter using the pause time in the received flow control message;

if said network device is already in the paused state and if a predetermined set of recently received flow control messages all came from the same downstream device, resetting the counter using said pause time, otherwise resetting the counter to said pause time only if resetting the counter will extend the period of time during which the network device remains in the paused state; and returning said network device to the transmit state once the counter counts through the established pause time.

10. A method as set forth in claim 9 further including the steps of maintaining a network device pause state flag by:

setting said flag to a first value each time the counter is triggered; and setting said flag to a second value each time the counter times out.

11. A method as set forth in claim 10 wherein the set of recently received flow control messages is limited to flow control messages received at the network device since the last time the pause timer was triggered.

12. A method as set forth in claim 11 wherein the step of determining whether the network device is in the paused state comprises reading the current value of the pause state flag.

13. A pause control system for a network element which can operate either in a transmit state or a paused state in accordance with flow control messages received from destination elements, each of said flow control messages including a pause time, said system including:

a state flag register for storing an value indicating whether the network element is currently in a transmit state or a paused state;

a counter which can be set to count through a timing cycle determined by an applied pause time;

read logic responsive to receipt of a flow control message to read the current value of the state flag register to determine whether the network element is already in a paused state; and flow control logic responsive to a determination that the network element is not already in the paused state to set the network element into the paused state and to trigger the counter operation, said flow control logic being further responsive to a determination that the network element is already in the pause state and that all flow control messages in a set of recently received flow control messages are from the same destination element to reset said counter to said pause time and to a determination that the network element is already in the paused state and that all flow control messages in a set of recently received flow control messages are not from the same destination element to reset the counter to said pause time only if such resetting extends the period of time during which the network element will remain in the paused state, and said flow control logic being further responsive to said counter having completed a timing cycle to return said network element to the transmit state.

14. A system as set forth in claim 13 further including state flag control logic for setting said flag to a first value each time said counter is triggered and for setting said flag to a second value each time said counter times out.

15. A system as set forth in claim 14 wherein the set of recently received flow control messages is limited to flow control messages received since the last time said counter was triggered.

16. For use at an input port of a packet switching device having multiple input ports and multiple output ports, each input port having an input buffer, a pause control system for determining whether the input port operates in a paused state wherein arriving packets are directed to the input buffer or a transmit state wherein arriving packets are directed to one of the output ports, said system comprising:

receive logic for receiving flow control messages from one or more of the multiple output ports, each said flow control message including a pause time;

a state flag register for storing a value indicating whether the input port is currently in a paused state or a transmit state;

a counter which can be set to count through a timing cycle determined by an applied pause time;

read logic responsive to receipt of a flow control message to read the current value of the state flag register to determine whether the input port is already in a paused state; and flow control logic responsive to a determination that the input port is not already in the paused state to set the input port into the paused state ad to trigger the counter operation, said flow control logic being further responsive to a determination that the input port is already in the paused state and that all flow control messages in a set of recently received flow control messages are from the same output port to reset said counter to said pause time and to a determination that the input port is already in the paused state and that all flow control messages in a set of recently received flow control messages are not from the same output port to reset the counter to said pause time only if such resetting extends the period of time during which the input port will remain in the paused state, and said flow control logic being further responsive to said counter having completed a timing cycle to return said input port to the transmit state.

17. For use in a network device which receives packets from upstream devices and directs those packets to downstream devices, a pause control system for determining whether the network device operates in a paused state wherein arriving packets are temporarily stored in the network device or a transmit state wherein arriving packets are directed toward one of the downstream devices, said system comprising:

receive logic for receiving flow control messages from one or more of the downstream devices, each said flow control message including a pause time;

a state flag register for storing a value indicating whether the network device is currently in a paused state or a transmit state;

a counter which can be set to count through a timing cycle determined by an applied pause time;

read logic responsive to receipt of a flow control message to read the current value of the state flag register to determine whether the network device is already in a paused state;

flow control logic responsive to a determination that the network device is not already in the paused state to set the network device into the paused state and to trigger the counter operation, said flow control logic being further responsive to a determination that the network device is already in the paused state and that all flow control messages in a set of recently received flow control messages are from the same downstream device to reset said counter to said pause time and to a determination that the network device is already in the paused state and that all flow control messages in a set of recently received flow control messages are not from the same downstream device to reset the counter to said pause time only if such resetting extends the period of time during which the network device will remain in the paused state, and said flow control logic being further responsive to said counter having completed a timing cycle to return said network device to the transmit state.

18. An article of manufacture comprising a computer usable medium having a computer readable program embodied in said medium, wherein said computer readable program when executed on a computer causes the computer to:

receive a flow control message at a network element, each of said flow control messages originating at a destination element and including a pause time;

determine whether the network element is in a paused state or a transmit state when the flow control message is received;

determine whether a set of recently received flow control messages all originate from the same destination element;

if the network element is not in a paused state, set it into such state and trigger a counter which will count out after the pause time in the received flow control message;

if the network element is already in the paused state and if the set of recently received flow control messages all originate from the same destination element, reset the counter using the pause time in the received flow control message, otherwise reset the counter only if such resetting extends the period of time during which the network element remains in the paused state; and respond to the timing out of the counter to return the network element to the transmit state.

19. An article of manufacture comprising a computer usable medium having a computer readable program embodied in said medium, wherein said computer readable program when executed on a computer causes the computer to:

receive a flow control message for an input port of a packet switching device having multiple input ports and multiple output ports, each of said input ports having an input buffer, each of said flow control messages originating at an output port of the packet switching device and including a pause time;

determine, at the time of receipt of the flow control message, whether the input port is in a paused state in which received packets are directed to the input buffer or a transmit state in which received packets are directed toward the output ports;

determine whether a set of recently received flow control messages all originate from the same output port;

if the input port is not in a paused state, set it into such state and trigger a counter which will count out after the pause time in the received flow control message;

if the input port is already in the paused state and if the set of recently received flow control messages all originate from the same output port, reset the counter using the pause time in the received flow control message, otherwise reset the counter only if such resetting extends it the period of time during which the input port remains in the paused state; and respond to the timing out of the counter to return the input port to the transmit state.

20. An article of manufacture comprising a computer usable medium having a computer readable program embodied in said medium, wherein said computer readable program when executed on a computer which controls a network device which receives packets from upstream packets and directs those packets to downstream devices causes the computer to:

receive a flow control message originating at a downstream device and including a pause time;

determine, at the time of receipt of the flow control message, whether the network device is in a paused state in which received packets are directed to a buffer in said network device or a transmit state in which received packets are directed toward the downstream devices;

determine whether a set of recently received flow control messages all originate from the same downstream device;

if the network device is not in a paused state, set it into such state and trigger a counter which will count out after the pause time in the received flow control message;

if the network device is already in the paused state and if the set of recently received flow control messages all originate from the same downstream device, reset the counter using the pause time in the received flow control message, otherwise reset the counter only if such resetting extends the period of time during which the network device remains in the paused state; and respond to the timing out of the counter to return the network device to the transmit state.

* * * * *